3,256,328
FLUORINE-CONTAINING SULFENYL CHLORIDES
Murray Hauptschein, Glenside, Pa., and Robert E. Oesterling, Silver Spring, Md., assignors to Pennsalt Chemicals Corporation, Philadelphia, Pa., a corporation of Pennsylvania
No Drawing. Original application Jan. 4, 1963, Ser. No. 249,319, now Patent No. 3,209,036, dated Sept. 28, 1965. Divided and this application Aug. 1, 1963, Ser. No. 303,463
4 Claims. (Cl. 260—543)

This application is a division of co-pending application Serial No. 249,319, filed January 4, 1963, by Murray Hauptschein and Robert E. Oesterling, now U.S. Patent 3,209,036.

This invention relates to certain compounds containing fluorine hydrogen, carbon and sulfur and more specifically is concerned with fluorocarbon polysulfides having the formula:

$$R_f(CH_2CF_2)_n\text{—}S_x\text{—}(CF_2CH_2)_nR_f$$

where the $R_f$ substituents are selected from the class consisting of chlorine, fluorine and halogenoalkyl groups free from iodine and preferably having not more than about 6 carbon atoms; where $n$ is from 1 to about 10 and where $x$ is from 2 to about 10. The more preferred compounds are those in which $R_f$ groups are perfluoroalkyl or perfluorochloroalkyl groups free from iodine and having not more than about 6 carbon atoms; where $n$ is 1 to about 6; and where $x$ is from 2 to about 5.

It will be understood that the invention includes compounds where the two $R_f$ substituents are the same or different; and where the two $n$'s are the same or different.

The invention also relates to novel sulfenyl chlorides which are derived from the above polysulfides.

As used in this application, a "halogenoalkyl" group is a halosubstituted alkyl group containing halogen and carbon. It may also contain hydrogen.

A "chloroalkyl" group means a halosubstituted alkyl group containing chlorine and carbon. It may also contain hydrogen.

A "fluoroalkyl" group means a halosubstituted alkyl group containing fluorine and carbon. It may also contain hydrogen.

A "fluorochloroalkyl" group means a halosubstituted alkyl group containing fluorine, chlorine and carbon. It may also contain hydrogen.

A "perfluoroalkyl" group means a halo-substituted alkyl group containing only fluorine and carbon.

A "perfluorochloroalkyl" group is a halo-substituted alkyl group containg only fluorine, chlorine and carbon.

These new polysulfide compounds are useful lubricants, particularly in ultra high pressure applications and exhibit unusual biological activity as discussed and illustrated hereafter. The polysulfides also serve as intermediates for the preparation of the new sulfenyl chloride compounds which are described hereafter.

The polysulfide compounds of the present invention are prepared through the reaction of sulfur with adducts and telomer iodides of vinylidene fluoride according to the following reaction:

$$R_f(CH_2CF_2)_n\text{—}I + S$$
$$\rightarrow R_f(CH_2CF_2)_n\text{—}S_x\text{—}(CF_2CH_2)_nR_f$$

where $x$, $n$ and $R_f$ are defined above and where the two $R_f$'s may be the same or different and the two $n$'s may be the same or different.

The iodine starting materials used in the above reaction are readily prepared in good yields by the reaction of 1,1-difluoroethylene generally in autoclaves at temperatures of 180 to about 220° C., with compounds having the formula $R_fI$, where $R_f$ is as defined above, as described in detail by Hauptschein et al. in Journal of the American Chemical Society, vol. 80, pp. 846-851. For example, $CF_2=CH_2$ reacts with $CF_3CF_2CF_2I$ to form $$CF_3CF_3CF_2[CH_2CF_2]_nI$$

Similarly, $CF_2=CH_2$ may be reacted with $CF_3I$, $CF_2ClCFClI$, $CF_3CFICF_3$, $CF_2ClCFICF_3$, $C_2F_5CFICF_3$ or $C_4F_9CFICF_3$ to form iodides for reaction with sulfur to produce the disulfides of the present invention.

The reaction with elemental sulfur will be carried out at a temperature of between about 150 and 300° C., preferably between about 160° C. and about 200° C. The pressure at which the reaction is carried out is not critical and in general will be between atmospheric and about 10,000 p.s.i.g. The ratio of sulfur to the organic iodide will generally be between 2 and about 20 moles of sulfur per mole of iodide and for most of the compounds of the present invention, will preferably be between 5 and about 15 moles of sulfur per mole of iodine. Reaction time is not critical and may range from a few minutes to several days. The reaction may generally be conducted in the vapor or liquid phase, and may be either a batch or continuous preparation.

The techniques for carrying out the reaction and the equipment used are also not critical. Most conveniently the ingredients are usually put into a suitable vessel, such as an autoclave and heated to the required temperature with stirring. Suitable materials of construction for the vessel are stainless steel, Monel and glass among others. In certain cases, particularly where the organic iodide is a solid, it may be desirable to use an inert solvent, such as a fluorochloroalkane, as a reaction medium.

Alternatively, the reaction may be carried out by passing the reactants through a heated tube or similar continuous reactor.

The following compounds may be cited as exemplary of the polysulfides of the present invention:

$(CF_3CF_2CF_2CH_2CF_2)_2$—$S_2$
$(CF_3CF_2CH_2CF_2)_2$—$S_2$
$(CF_3CF_2CH_2CF_2)_2$—$S_3$
$[(CF_3)_2CFCH_2CF_2]_2$—$S_2$
$[(CF_3)_2CFCH_2CF_2]_2$—$S_4$
$[CF_3CF(CF_2Cl)CH_2CF_2]_2$—$S_2$
$[CF_3CF(CF_2Cl)CH_2CF_2]_2$—$S_5$
$(CF_2ClCCl_2CH_2CF_2)_2$—$S_2$
$(CF_2ClCFClCH_2CF_2)_2$—$S_2$
$(CF_2ClCFClCH_2CF_2)_2$—$S_5$
$(CF_3CH_2CF_2)_2$—$S_2$
$(CF_2ClCH_2CF_2)_2$—$S_2$
$[C_4F_9CF(CF_3)$—$(CH_2CF_2)_5]_2$—$S_2$
$[CF_2ClCF(CF_3)CF_2CF(CF_3)(CH_2CF_2)_6]_2$—$S_2$
$CF_3CF_2CH_2CF_2$—S—S—$CF_2CH_2CF(CFCl)CF_3$
$[(CF_3)_2CF(CH_2CF_2)_4]_2$—$S_2$
$[CF_2ClCCl_2(CH_2CF_2)_5]_2$—$S_3$
$[CF_2ClCFCl(CH_2CF_2)_6]_2$—$S_4$

As illustrated in Example 7, these new compounds are highly effective in the control of certain plant diseases including particularly late tomato blight. The effectiveness exhibited in the test of Example 7 is comparable to that found in the best commercial preparations now used for the control of the fungi on which the tests were conducted and is very much higher than that of elemental sulfur. Of the polysulfides of the present invention, those preferred as fungicides are:

$(CF_3CF_2CF_2CH_2CF_2)_2$—$S_2$
$(CF_3CF_2CH_2CF_2)_2$—$S_2$
$(CF_3CF_2CH_2CF_2)_2$—$S_3$
$[(CF_3)_2CFCH_2CF_2]_2$—$S_2$
$[(CF_3)_2CFCH_2CF_2]_2$—$S_4$
$[CF_3CF(CF_2Cl)CH_2CF_2]_2$—$S_2$
$[CF_3CF(CF_2Cl)CH_2CF_2]_2$—$S_5$ $(CF_2ClCCl_2CH_2CF_2)_2—S_2$
$(CF_2ClCFClCH_2CF_2)_2—S_2$
$(CF_2ClCFClCH_2CF_2)_2—S_5$
$(CF_3CH_2CF_2)_2—S_2$
$(CF_2ClCH_2CF_2)_2—S_2$

Of the above listed compounds, the one most preferred for its fungicidal activity is $CF_3CF_2CF_2CH_2CF_2—S—S—CF_2CH_2CF_2CF_2CF_3$ Optimum dosage rates will vary with the plants being treated but will generally fall between 1 and about 20 pounds per acre, and for most applications dosages of from 2 to 10 pounds per acre will be preferred.

The new polysulfides of the present invention may themselves be reacted with chlorine to form new sulfenyl chlorides having the general formula: $R_f(CH_2CF_2)_n—SCl$ where $R_f$ and $n$ are as defined above. The values of $R_f$ and $n$ which were preferred for the above polysulfides are similarly preferred for the new sulfenyl chlorides.

In accordance with the present invention, these compounds are made by reacting chlorine with polysulfides of the type:

$R_f(CH_2CF_2)_n—S_x—(CF_2CH_2)_nR_f$ where $R_f$, $n$ and $x$ have the values given above and where the $R_f$'s may be the same or different and the $n$'s may be the same or different.

This reaction is generally conducted at a temperature between about 20° C. and about 250° C. and preferably between about 50° C. and about 150° C. Pressure is not critical and will normally be from about atmospheric to about 10,000 p.s.i.g. Reaction time is also not critical and may range from about ten minutes to several days. Chlorine should be present in proportions ranging from about 1 to about 10 moles of chlorine per mole of polysulfide.

As in the preparation of the polysulfides, particular techniques and apparatus are not important in the preparation of the new sulfenyl chloride. Generally the polysulfide is most conveniently put into a vessel capable of containing pressure, the required amount of chlorine is added and the reactants are heated to the above mentioned reaction temperatures. Alternatively, the reaction can be carried out by passing the chlorine and the polysulfide simultaneously through a hot tube or other continuous reactor.

The following compounds may be cited as exemplary of the sulfenyl chlorides of the present invention:

$CF_3CF_2CF_2CH_2CF_2—SCl$
$CF_3CF_2CH_2CF_2—SCl$
$CF_3CF_2CH_2CF_2—SCl$
$(CF_3)_2CFCH_2CF_2—SCl$
$(CF_3)_2CFCH_2CF_2—SCl$
$CF_3CF(CF_2Cl)CH_2CF_2—SCl$
$CF_3CF(CF_2Cl)CH_2CF_2—SCl$
$CF_2ClCCl_2CH_2CF_2—SCl$
$CF_2ClCFClCH_2CF_2—SCl$
$CF_2ClCFClCH_2CF_2—SCl$
$(CF_3CH_2CF_2)_2—SCl$
$(CF_2ClCH_2CF_2)_2—SCl$
$C_4F_9CF(CF_3)—(CH_2CF_2)_5—SCl$
$CF_2ClCF(CF_3)CF_2CF(CF_3)(CH_2CF_2)_6—SCl$
$(CF_3)_2CF(CH_2CF_2)_4—SCl$
$CF_2ClCCl_2(CH_2CF_2)_5—SCl$
$CF_2ClCFCl(CH_2CF_2)_6—SCl$

The sulfenyl chlorides of the present invention are useful as anti-wear additives in extreme pressure lubricants and also exhibit fungicidal properties. While the following examples will serve to illustrate specific embodiments of the invention, they should in no way be taken to limit the scope of the invention.

*Example 1.—Preparation of 2,2-di-H-nonafluoroamyl disulfide*

72 grams (0.2 mole) of $(CF_3CF_2CF_2CH_2CF_2I)$ and 32 grams (1.0 mole) of sulfur were heated to 200° C. for 24 hours in a 300 ml. Monel autoclave. The autoclave was shaken during the 24 hour period.

The autoclave is cooled, vented, and the 50 grams of liquid products are filtered into a distilling flask. Solid sulfur and solid iodine are observed as side products.

Vacuum distillation of the liquid products gives a small amount (less than 5 grams) of unreacted $C_3F_7CH_2CF_2I$, and 17 grams of $(CF_3CF_2CF_2CH_2CF_2)_2—S_2$, a pale yellow oil having a boiling point of approximately 50° C. at about 0.4 mm. of mercury and a refractive index ($n_D^{23}$) of 1.346.

The calculated composition of $C_{10}H_4F_{18}S_2$ is: C, 22.65; H, 0.76; S, 12.09. The actually found composition is: C, 22.76; H, 0.82; S, 12.06.

An additional 21 gram fraction is separated by distillation and found to consist of polysulfides having the formula $(CF_3CF_2CF_2CH_2CF_2)_2—S_x$ where $x$ equals from 3 to about 5.

*Example 2.—Preparation of 3-trifluoromethyl-2,2-di-H-hexafluorobutyl disulfide*

72 grams (0.2 mole) of $(CF_3)_2CFCH_2CF_2I$ and 32 grams (1.0 mole) of sulfur are heated to about 200° C. for 24 hours in a 300 ml. Monel autoclave which is shaken during the heating period.

The autoclave is cooled, vented, and approximately 50 grams of liquid products are filtered into a distilling flask. The solid products separated by filtration consist mainly of sulfur and iodine.

Vacuum distillation of the liquid products gives a small amount (less than about 5 grams) of unreacted $(CF_3)_2CFCH_2CF_2I$ and 17 grams of $(CF_3)_2CFCH_2CF_2—S—S—CF_2CH_2CF(CF_3)_2$ a pale yellow oil having a boiling point of about 50° C. at about 0.4 mm. of mercury.

An additional fraction weighing approximately 22 grams is separated by distillation and found to consist of polysulfides having the formula $(CF_3)_2CF_2CH_2CF_2S_xCF_2CH_2CF_2(CF_3)_2$ where $x$ is from 3 to about 5.

*Example 3.—Preparation of 3-chloro-2,2-di-H-hexafluorobutyl disulfide*

80 grams (0.2 mole) of $CF_3CClFCH_2CF_2I$ and 32 grams (1.0 mole) of sulfur are heated to about 200° C. for about 24 hours in a 300 ml. Monel autoclave which is shaken during the heating period.

The autoclave is cooled, and vented, and approximately 55 grams of liquid products are filtered into a distilling flask, separating out solid sulfur and iodine.

Vacuum distillation of the liquid filtrate gives a small amount of unreacted $CF_3CClFCH_2CF_2I$ (less than 6 grams), and about 19 grams of a pale oily liquid having a slightly yellow color and boiling at about 50° C. at about 0.3 mm. of Hg. The structure of the liquid is determined by analysis to be $[CF_3CClFCH_2CF_2]_2—S_2$.

About 23 grams of a higher boiling residue is obtained and found to consist of polysulfides having the formula: $[CF_3CFClCH_2CF_2]_2—S_x$ where $x$ is from 3 to about 5.

The compounds of the invention containing the $—CH_2—CF_2—S_x—CF_2—CH_2—$ groups are characterized by their unusual stability to oxidizing agents such as aqueous chlorine solutions, nitric acid or perchloric acid. Thus while polysulfides containing the isomeric arrangement $—CF_2—CH_2—S_x—CH_2—CF_2—$ are readily oxidized to sulfonyl chlorides by reagents such as an aqueous chlorine solution with rupture of the sulfur-sulfur bond, the polysulfides of the invention are surprisingly stable to this and other types of oxidizing agents as shown by Examples 4, 5 and 6 which follow.

Example 4.—Treatment of polysulfides with chlorine and water 50 grams of $$CF_3CF_2CF_2CH_2CF_2—S—S—CF_2CH_2CF_2CF_2CF_3$$

is added to a Monel autoclave to which is introduced 20 grams of water and about 20 grams of liquid chlorine. The mixture is shaken and heated to 100° C. for about 5 hours.

At the end of that time the chlorine is vented. Analysis of the autoclave contents indicates that no reaction has occurred.

Example 5.—Treatment of polysulfides with $HNO_3$ 20 grams of $[(CF_3)_2CF_2CH_2CF_2]_2—S_2$ is added to 20 grams of concentrated nitric acid and the mixture is refluxed for 5 hours.

Separation of the organic compound and analysis indicates that no reaction has occurred.

Example 6.—Treatment of polysulfide with perchloric acid 20 grams of $(CF_3CF_2CF_2CH_2CF_2)_2—S_2$ are treated with 35% perchloric acid and refluxed for 5 hours. Analysis indicates that no reaction has occurred.

Example 7.—Control of late tomato blight with $(CF_3CF_2CF_2CH_2CF_2)—S_2$

A 10% solution of the above disulfide in diacetone alcohol is prepared for use as a fungicide. A number of 3 to 4 week old tomato seedlings are sprayed with the fungicidal solution at a dosage equivalent to 5 pounds per acre of the disulfide, and after drying are inoculated with a suspension of sporangia from lima bean agar cultures of *Phytophthora infestans* and then incubated for 18 hours at 10 to 20° C. in an atmosphere having 100% relative humidity. After incubation, counts are made of spots of late blight infection as they appear. Seedlings sprayed with the above fungicidal solution show less than 1/13 as many spots as do seedlings which have been similarly inoculated and incubated but which have not been treated with the disulfide fungicidal solution. Exact calculation of the results indicates a 93.4 percent reduction in spots due to treatment with the disulfide solution.

Other polysulfides of the invention, such for example as $$(CF_3)_2CFCH_2CF_2—S—S—CF_2CH_2CF(CF_3)_2$$
$$CF_3CFClCH_2CF_2—S_4—CF_2CH_2CFClCF_3$$

and $CF_3CF_2CH_2CF_2—S_3—CF_2CH_2CF_2CF_3$ display similar activity in the control of late tomato blight.

Example 8.—Preparation of sulfenyl chloride derivative of $(CF_3CF_2CF_2CH_2CF_2)_2S_2$ 7 grams of the above disulfide are treated with 10 grams of anhydrous chlorine in a Monel autoclave at about 105° C. for 38 hours. Distillation of the liquid product gives 5 grams of colorless oil having the structure $CF_3CF_2CF_2CH_2CF_2—SCl$, and exhibiting a slight precipitate of free sulfur on standing. This decomposition is characteristic of sulfenyl chlorides.

Example 9.—Preparation of sulfenyl chloride derivative of $(CF_3)_2CFCH_2CF_2—S—S—CF_2CH_2CF(CF_3)_2$ 7 grams of the above disulfide are treated with about 10 grams of anhydrous fluorine in a Monel autoclave at about 110° C. for about 35 hours. Distillation of the liquid product gives about 5 grams of $(CF_3)_2CFCH_2CF_2—SCl$.

Example 10.—Preparation of the sulfenyl chloride derivative of $CF_3CClFCH_2CF_2—S—S—CF_2CH_2CClFCF_3$ Approximately 10 grams of the above disulfide are treated with about 13 grams of anhydrous chlorine in a Monel autoclave held at about 110° C. for about 35 hours. Distillation of the liquid product yields approximately 7 grams of $CF_3CClFCH_2CF_2—SCl$, a liquid which exhibits a slight precipitate of sulfur on standing.

We claim:
1. Compounds having the formula $R_f(CH_2CF_2)_n—SCl$ wherein $R_f$ is selected from the class consisting of chlorine, fluorine, and halogenoalkyl groups free from iodine having not more than about 6 carbon atoms and where $n$ is from 1 to about 10.
2. Compounds of claim 1 wherein $R_f$ is a perfluoroalkyl group.
3. Compounds of claim 1 wherein $R_f$ is a perfluorochloroalkyl group.
4. Compounds having the formula

$$C_3F_7(CH_2CF_2)_n—SCl$$

where $n$ is from 1 to about 10.

References Cited by the Examiner
UNITED STATES PATENTS

| | | | |
|---|---|---|---|
| 2,853,516 | 9/1958 | Louthan | 260—543 |
| 2,914,566 | 11/1959 | Hauptschein et al. | 260—543 |

LORRAINE A. WEINBERGER, *Primary Examiner.*

B. M. EISEN, *Assistant Examiner.*